Jan. 15, 1963 J. E. WIESCHEL 3,073,458
POWERED OUTRIGGER BEAMS FOR VEHICLES
Filed Oct. 9, 1961
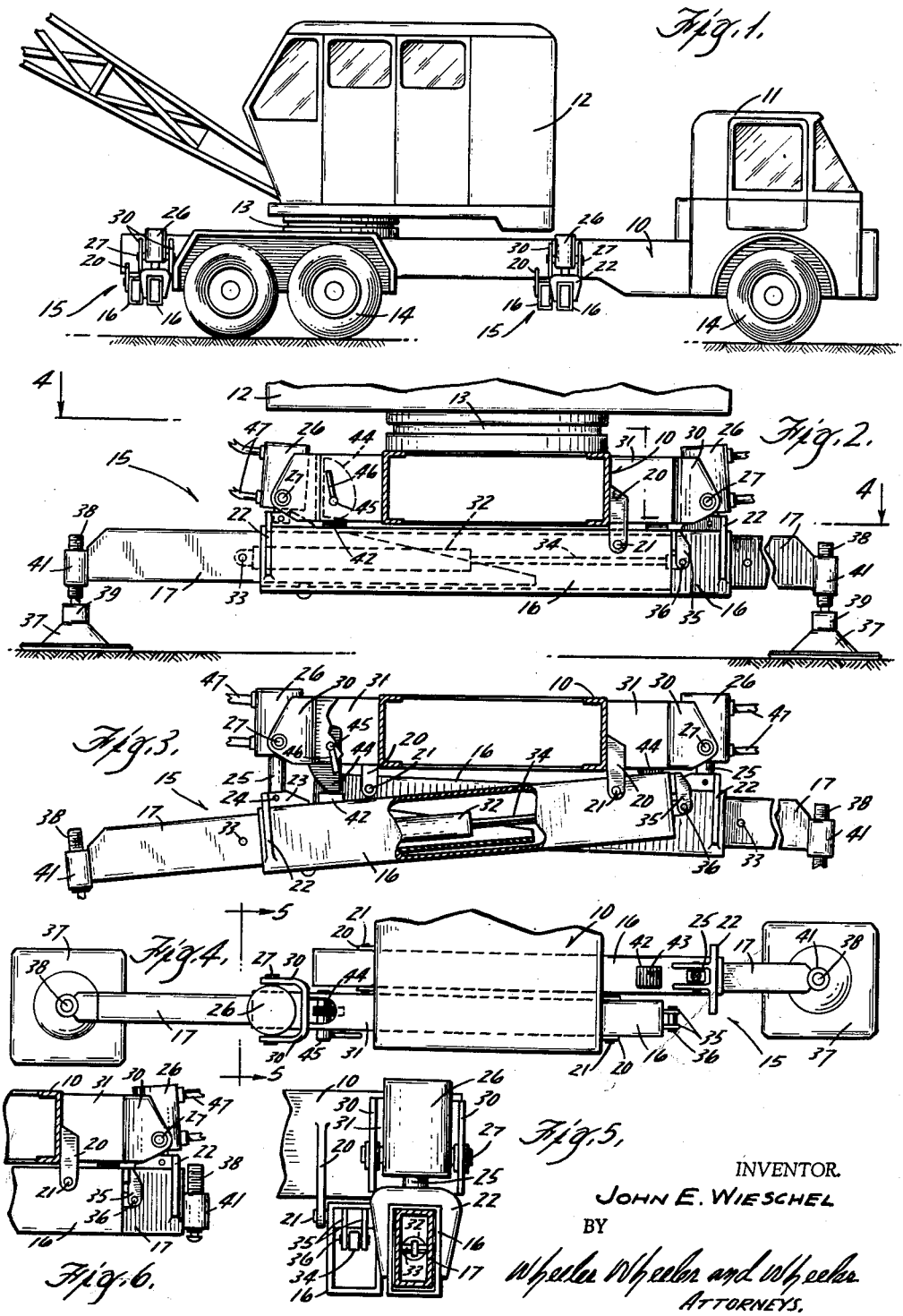
INVENTOR.
JOHN E. WIESCHEL
BY
Wheeler, Wheeler and Wheeler
ATTORNEYS.

United States Patent Office 3,073,458
Patented Jan. 15, 1963

3,073,458
POWERED OUTRIGGER BEAMS FOR VEHICLES
John E. Wieschel, Pewaukee, Wis., assignor to Harnischfeger Corporation, Milwaukee, Wis., a corporation of Wisconsin
Filed Oct. 9, 1961, Ser. No. 143,752
6 Claims. (Cl. 212—145)

This invention relates to powered outrigger beams for vehicles.

Heretofore, commercially available mobile cranes and other like excavating and material handling machinery, etc., have been equipped with telescopic outrigger beams of the type shown in United States Patent 2,229,840, owned by the assignee of the present invention, and in which blocks are placed manually beneath the ends of the extended beams to stabilize the vehicle against tipping.

According to the present invention, outrigger beams are automated, thus to eliminate the need for blocking and to greatly speed up the process of shifting the position of the vehicle. This is accomplished in the present invention in a construction which is relatively simple both mechanically and hydraulically.

In devices embodying the present invention, each outrigger beam comprises relatively fixed and relatively extensible telescopic sections. The relatively fixed section is pivotally mounted to the chassis frame and is swingable about the pivot in a vertical plane. The relatively extensible telescopic section of the beam has a ground engaging foot. There is one motor for selectively extending and retracting the telescopic beam sections. This motor is desirably disposed in protected position within the hollow beam sections. A second motor is provided for swinging the relatively fixed telescopic section about its pivotal connection with the frame. This motor has a fixed pivotal connection with the frame and does not move with the extensible section. I may optionally provide a gravity-biased cam to lock the relatively fixed section of the beam in any position of its pivotal adjustment aforesaid.

Other objects, advantages and features of the invention will appear from the following disclosure in which:

FIG. 1 is a fragmentary side view of a truck crane having outrigger beams embodying the present invention.

FIG. 2 is a fragmentary end view of the chassis of the truck showing the outrigger beam extended, but in its uppermost position.

FIG. 3 is a view similar to FIG. 2, but showing the outrigger beam pivotally moved to lowermost position.

FIG. 4 is a fragmentary view taken along the line 4—4 of FIG. 2.

FIG. 5 is an enlarged fragmentary cross section taken along the line 5—5 of FIG. 4.

FIG. 6 is a fragmentary end view of the truck chassis showing the telescopic beam section completely retracted and the ground-engaging foot removed for transport.

The truck crane shown herein by way of example has a conventional chassis or frame 10 with the usual driver's cab 11 over the front wheels 14 and a revolvable machinery platform and operator's cab 12 mounted on the turntable 13 over the rear wheels 14. In the embodiment illustrated, the chassis 10 is supported on ground-engaging pneumatic tired wheels 14, although it is clear that a crawler or track-laying type of wheeled ground support could support the chassis 10.

Intermediate the front and rear wheels, the frame 10 is provided with laterally extensible outrigger beams, each being indicated generically by reference character 15. There are similar outrigger beams 15 mounted on chassis 10 to the rear of the rear wheels 14. The several beams 15 are substantially identical and are shown in greater detail in FIGS. 2 through 6. Each beam spans transversely across the frame 10 at its undersurface.

Each outrigger beam 15 consists of a relatively fixed outer beam section 16 and a telescopically related inner beam section 17, which is selectively extendible and retractable within the outer beam section 16. Both beam sections 16 and 17 conventionally have box section configuration for maximum strength and to provide a housing for hydraulic motor 32.

The respective beam sections 16 are pivotally mounted to the truck frame 10 for limited oscillation in a vertical direction. The respective beam pivots are desirably disposed at the rear ends of the respective beams 16 and at the side of the frame opposite that side from which the extensible beam sections 17 project.

For each beam 15, the frame 10 has a downwardly projecting pair of ears 20 which constitute a pivot bracket on which the relatively fixed section 16 of the beam 15 is swingable on a pivot pin 21. At its opposite end, beam section 16 is embraced by a yoke 22 which has a bracket 23 with a pivotal connection on pin 24 to the piston rod 25 of hydraulic motor 26. Motor 26 is supported on trunnions 27 which are oscillatable in the spaced ears 30 which project laterally from the edge of frame 10 on a box section bracket 31.

Telescopic movement is imparted to the beam section 17 by hydraulic motor 32 which is within the hollow cross sections of beams 16, 17 and is pivotally connected to the beam 17 on the pin 33. Motor 32 has a piston 34, the end of which is pivotally connected to the fixed beam 16 on the pin 36 of bracket 35. Both motors 26, 32 are double acting and appropriate manipulations of conventional control mechanism therefor (not shown) will shift the beam between its extreme lateral positions shown in FIGS. 2 and 5 and its extreme pivotal positions shown in FIGS. 2 and 3.

Each telescopic beam section 17 has at its end a ground engaging foot 37 which may be manually adjusted vertically on its threaded stem 38 in the threaded socket 41 mounted at the end of the beam section 17. Foot 37 has a releasable coupling 39 with stem 38 and may be completely removed, as shown in FIG. 5, usually during transport of the vehicle over the road.

From the foregoing, it is clear that both sets of outrigger beams 15 may be manipulated as desired to partially or completely extend respective telescopic sections 17 and to adjust vertically the entire beam structures 15 by swinging them about their pivots 21, thus to lower the feet 37 to ground engagement and to stabilize the vehicle chassis 10 against tilting forces resultant from use of the crane or other excavating machinery mounted on the turntable 13.

I may optionally provide a lock to hold the beams 15 in any position to which they are adjusted about the axis of pivot pins 21. For this purpose each beam section 16 is provided on its upper surface with a bearing pad 42, the top surface of which may be serrated as shown at 43 in FIG. 4. Pivotally mounted in the box section bracket 31 is an eccentric cam 44 which is gravity biased to pivot about the axis of its pivot pin 45 and follow the bearing pad 42 during downward movement of the beam 15. The bearing surface of cam 44 is shaped to have a constant angle with the serrated face 43 of the pad 42. Accordingly, the eccentric cam lock 42, 43, 44 will preclude inadvertent collapse of the outrigger structure if for any reason the hydraulic motor 26 fails. The lock may be manually released by rotating it by its handle 46.

As the respective beams 15 swing about the axes of pins 21, hydraulic motors 26 are free to articulate about their pivot pins 24, 27. This slight oscillation is the only movement to which the hydraulic lines 47 to the hydraulic motors 26 are subject. Accordingly, the hydraulic line connections to the motors 26 are relatively simple and trouble-free.

Moreover, the relatively fixed position of the hydraulic motors 26 at the level of the frame 10 avoids exposure of these motors to dirt and other causes of equipment breakdown to which they would otherwise be exposed if at the end of the extensible beam section 17.

In use the vehicle is driven (with all beam sections fully retracted and feet 37 removed, as shown in FIG. 6) to the operational site. Feet 37 are then attached. The extensible sections 17 of all beams 15 are then extended either fully or partially, depending on terrain, and motors 26 actuated to lower the feet 37 into ground engagement. Couplings 39 constitute swivels to permit feet 37 to conform to the ground. Locking cams 44 are optionally engaged. The vehicle is now stabilized. If the vehicle is to be moved into a new position, the motors 26 are actuated to elevate feet 37, the vehicle is moved and the beams 15 relowered.

This arrangement provides a greater degree of adjustment to stabilize vehicles on uneven terrain than previous devices hitherto used for this purpose. It is versatile in application in that it can be used at intermediate positions of beam extension.

I claim:

1. In a vehicle having a wheel supported frame, an outrigger beam comprising telescopic sections, one of said sections having a pivotal connection to the frame on which it is movable primarily vertically, the other section having a ground engaging foot, a first motor for controllably extending and telescoping the respective beam sections and a second motor for controllably pivoting said beam about its pivotal connections with the frame whereby the position of the foot with respect to the frame is readily adjusted.

2. The device of claim 1 in combination with means to lock said beam in any position about its said pivotal connection with the frame.

3. The device of claim 2 in which said beam has a bearing pad, said frame having a gravity biased eccentric cam which together with the pad constitutes said lock.

4. The device of claim 1 in which said beam spans laterally beneath the frame, said pivotal connection being at the side of the frame opposite the side from which the extensible beam section projects.

5. The device of claim 1 in which said motors are hydraulically actuated.

6. The device of claim 1 in which said frame has a pivotal mounting for said second motor on which it is oscillatable in response to the pivotal movement of the beam about its pivotal connection to the frame.

References Cited in the file of this patent

UNITED STATES PATENTS

| | | |
|---|---|---|
| 2,365,169 | Billings | Dec. 19, 1944 |
| 2,958,538 | Norris et al. | Nov. 1, 1960 |
| 3,021,015 | Bowman | Feb. 13, 1962 |